United States Patent Office 2,745,687
Patented May 15, 1956

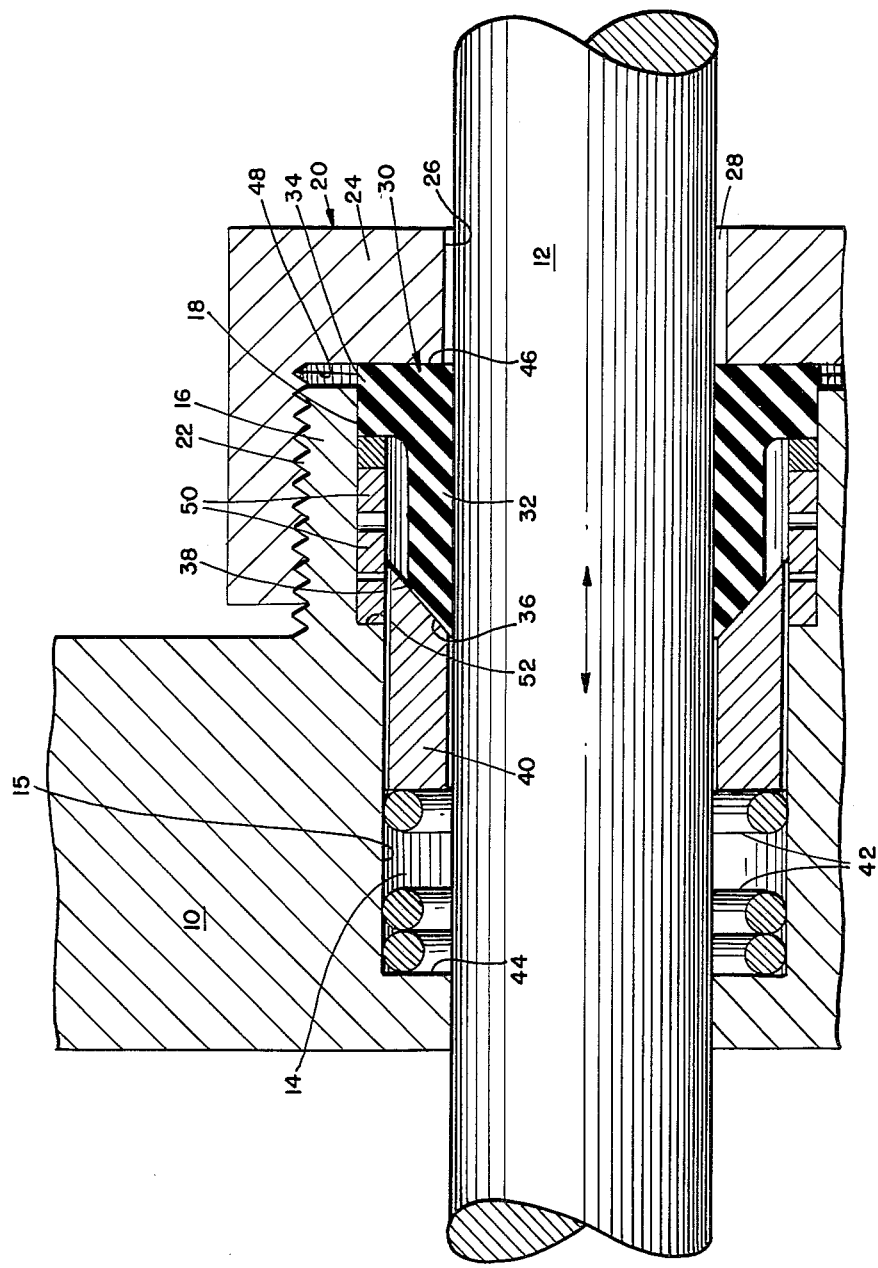
INVENTOR:
THEODORE T. STACK
BY
Edward R. Lowndes

2,745,687

SHAFT SEAL

Theodore T. Stack, Chicago, Ill., assignor to Crane Packing Company, Chicago, Ill., a corporation of Illinois Application August 31, 1953, Serial No. 377,298

5 Claims. (Cl. 286—30)

The improved shaft seal comprising the present invention has been designed for use primarily in sealing the circumferential clearance between two interfitting or opposed circular parts which are capable of axial movement relative to each other as for example the reciprocating plunger of a pump and the sleeve or housing through which it passes. The invention is however capable of other uses and the same may, if desired, with or without modification, be employed for sealing the space existing between similar interfitting circular parts of like construction, whether these parts be axially reciprocable relative to each other or whether they be capable of relative rotation. Irrespective however of the particular use to which the present invention may be put, the essential features thereof remain substantially the same.

It is one of the objects of the present invention to provide a shaft seal suitable for preventing fluid leakage around a sliding shaft which seal is capable of adjustment so that predetermined degrees of sealing pressure may be applied against the shaft. A similar and related object of the invention is to provide a fluid seal of this character having a flexible deformable sealing element associated therewith, which element, by adjustment of certain seal parts, is capable of distortion to seal the opening between related circular parts having slightly different diameters.

A still further object of the invention is to provide an improved shaft seal designed particularly for use in sealing a reciprocable shaft, stem, rod or similar member and which will maintain an extremely effective seal without interfering with or impeding the movement of the reciprocable member. In connection with this latter object of the invention, it has been found that rubber, whether natural or synthetic, rubber compounds and most synthetic plastic materials of a similar nature having inherent elasticity are not suitable under all circumstances for use in contact with a reciprocable member because the rubber or other material has a high coefficient of friction on the metal of the member, particularly when the latter is not polished. The result of this has been that when pressures sufficiently high as to effect sealing are applied to the material, the friction developed between the material and the reciprocating member is so high that it interferes with and impedes the movement of the member. The present invention, in an effort to overcome the above noted limitation that is attendant upon the use of rubber-like materials for sealing purposes, contemplates the use of certain materials which are commercially available having a low coefficient of friction and which are capable of being deformed so as to present varying degrees of pressure to the reciprocating member without binding upon the shaft.

Yet another object of the invention is to provide a shaft seal utilizing a packing material of the type briefly outlined above wherein the effectiveness of sealing the shaft is dependent primarily upon the character of the packing material rather than upon any hydraulic action exerted thereon by the liquid or gaseous material which it is desired to confine to the vicinity of the reciprocating member.

Still another object of the invention is to provide a shaft seal having associated therewith a flexible packing element which will be held in snug frictional engagement with the reciprocating shaft of a pump, piston rod or the like, equally as effectively during the pressure stroke as during the return stroke.

Still another object is to provide a shaft seal of the character briefly outlined above in which the parts thereof may readily be removed and likewise adjusted from the exterior of the seal utilizing ordinary tools.

The provision of a shaft seal which is extremely rugged and durable and which is therefore unlikely to get out of order; one which is effective in sealing fluids either under vacuum or pressure; one which automatically compensates for wear or shrinkage of the sealing parts; one which is extremely simple in its construction and which may therefore be manufactured at a low cost; one which is well adapted for use at high temperatures or pressures and which also is unaffected by the inroads of corrosive chemical liquids, are further desirable features that have been borne in mind in the production and development of the present invention.

Other objects and advantages of the invention, not at this time enumerated, will become more readily apparent as the nature of the invention is better understood. In the accompanying single sheet of drawings forming a part of this specification an approved embodiment of the invention has been illustrated.

In these drawings the figure represents a longitudinally sectional view taken substantially centrally through a shaft seal constructed in accordance with the principles of the present invention and showing the same operatively associated with the reciprocating shaft of a fluid pump.

While the principles of this invention are broadly applicable to sealing the space existing between relatively movable members of various characteristics, they are particularly useful in connection with stuffing boxes for providing gas or liquid-tight joints between a housing and a reciprocating shaft extending therethrough. Accordingly the invention has been so illustrated in the drawings and in the embodiment shown. A housing 10 is adapted to receive therethrough a shaft 12, the shaft being capable of reciprocating movement in the housing in opposite directions as indicated by the arrows. The housing 10 is provided with a chamber 14 having a cylindrical wall or bore 15 and adapted to receive therein the improved sealing elements of the present invention. The housing 10 is provided with a cylindrical boss-like portion 16 which projects laterally from the housing and which is provided with a counterbore 18 in communication with the chamber 14 or bore 15. A cap member 20 threadedly received as at 22 on the projecting member 16 serves to close the open end of the chamber and cooperates with the sealing elements of the present invention in a manner that will be made clear presently.

The cap member 20 is provided with an inwardly extending radial flange 24 having a central opening 26 provided therein through which the shaft 12 extends. The diameter of the opening 26 is somewhat greater than that of the shaft 12 so that a slight clearance 28 exists between the shaft and cylindrical wall of the opening 26.

Disposed within the chamber 14 and surrounding the shaft 12 is a sealing sleeve 30, this sleeve constituting an important feature of the present invention. The sleeve 30 is of tubular form and includes a cylindrical portion 32 provided with a radially extending flange 34 at one end. The other end of the cylindrical portion 32 is provided with a tapered outer surface 36 designed for camming or wedging engagement with the complementary surface 38 provided at one end of a metallic wedge member 40 preferably formed of bronze and slidably received within the bore 15.

The sealing member 30 is preferably constructed of a material having certain desirable qualities in connection with the present seal. It is preferably made of a polytetrafluoroethylene polymer known as "Teflon," a trademark name of E. I. du Pont de Nemours & Co. This material remains in its solid state at all temperature ranges which are normally encountered and is chemically inert from extremely low temperatures up to approximately 575° F. Throughout this wide range of temperatures it will resist the attack of corrosion reagents and dissolution by solvents. More important to the present seal is the fact that physically, this material is extremely tough and has a low coefficient of friction with respect to metals particularly steel as well as low abrasive quality. Furthermore the material is of a resilient nature. Because of the fact that "Teflon" has a low coefficient of friction with metal its use as a packing material in the present instance precludes its resisting the reciprocal movements of the shaft 12 through the chamber 14.

In order to pack the material of the sealing member 30 tightly about the shaft 12, a coil spring 42 having a relatively high rate, i. e. great strength, is disposed within the chamber 14 and bears at one end against the radial surface 44 at the closed end of the chamber and bears at its other end against the end of the wedge member 40 thus normally urging the opposed cooperating wedge surfaces 38 and 36 of the wedge member 40 and sealing ring 30 respectively into engagement with each other. The end face 46 of the sealing member 30 is thus urged into sealing engagement with the inner face 48 of the radial wall 24 of the cap member 20. A second coil spring 50 is disposed within the counterbore 18 and bears at one end against the radial shoulder 52 of the counterbore and at its other end against the face of the radial flange 34 provided on the sealing member 30. The flange 34 is thus yieldingly clamped between the forward end of the spring 50 and the radial surface 48.

From the above description it will be seen that the present seal is readily capable of insertion into the packing gland provided for it, the various annular parts 42, 40, 50 and 30 being telescoped over the shaft 12 and slid into position within the gland in the order named. The bearing cap member 20 is then finally threaded onto the projecting boss 16 so as to place the various parts under compression. The rate or degree of spring tension of the spring 50 is not as great as the rate of the spring 42 and thus when tightening the cap member 20 the spring 50 is first compressed to an extent sufficient to allow the mating inclined cam surfaces 38 and 36 of the sealing member 30 and wedge member 40 to contact each other. As the cap member 20 continues to be tightened, a pressure is built up between these two mating surfaces and, because of their inclination relative to the axis of the shaft, which preferably is in the neighborhood of 45°, the deformable sleeve member 30 is forced against the surface of the shaft to seal off the same. Further and continued tightening of the cap member will ultimately cause compression of the spring 42 and when the required degree of pressure has been attained the seal assembly will be complete.

In the actual operation of the seal in connection with a pump of the reciprocable plunger type, it is preferable that the seal be installed so that the pressure stroke of the plunger or shaft 12 is opposed to the tapered end of the sealing member 30, i. e. to the right as viewed in the drawing. Since the internal diameter of the ring 40 closely approximates the diameter of the shaft 12 there is little or no tendency for the material of the sealing member 30 to be forced into the space existing between the shaft and member 40. The fluid therefore has little tendency to enter between the two inclined surfaces 38 and 36 and as a consequence the sealing-off pressure exerted by the member 30 is a function of the pressure exerted by the spring 42 rather than a function of the pressure exerted by the fluid against the sealing member. The seal therefore is capable of effective sealing in either direction of movement of the shaft 12.

The invention is not to be limited to the exact arrangement of parts shown in the accompanying drawings or described in this specification since various changes in the details of construction may be resorted to without departing from the spirit of the invention. Only in so far as the invention has particularly been pointed out in the accompanying claims is the same to be limited.

What I claim and desire to secure by Letters Patent is:

1. A seal for sealing the space existing between a relatively movable cylindrical shaft and a surrounding casing, said seal comprising in combination means on said housing providing an end wall, a cylindrical bore projecting forwardly from said end wall, an open ended counterbore forwardly of said bore and defining a forwardly facing shoulder, an end closure member for the forward open end of the cylindrical bore, a tubular sealing member surrounding said shaft and comprised of a deformable material having a low coefficient of friction with respect to the material of the shaft, said sealing member being provided with a radial flange closely fitting within said counterbore and having a forward face bearing against the end closure member, a sleeve portion extending rearwardly from said radial flange and fitting closely around said shaft, the rear end of said sleeve portion being inclined rearwardly and inwardly to provide a conical sealing face, a rigid sealing ring closely surrounding said shaft rearwardly of said sealing member, said sealing ring having a forwardly and outwardly inclined conical sealing surface bearing against and substantially coextensive with the conical sealing surface provided on said sleeve portion, a compression spring interposed between the shoulder on said casing and the radial flange on said sealing member and serving to normally urge said flange against said end closure member, and a compression spring interposed between the end wall of said casing and the rear face of said sealing ring and serving to normally urge said sealing ring forwardly within said bore against said deformable sealing member.

2. A seal for sealing the space existing between a relatively movable cylindrical shaft and a surrounding casing, said seal comprising in combination means on said housing providing an end wall, a cylindrical bore projecting forwardly from said end wall, an open ended counterbore forwardly of said bore and defining a forwardly facing shoulder, an end closure member for the forward open end of the cylindrical bore, a tubular sealing member surrounding said shaft and comprised of a deformable material having a low coefficient of friction with respect to the material of the shaft, said sealing member being provided with a radial flange closely fitting within said counterbore and having a forward face bearing against the end closure member, a sleeve portion extending rearwardly from said radial flange and fitting closely around said shaft, the rear end of said sleeve portion being inclined rearwardly and inwardly to provide a conical sealing face, a rigid sealing ring closely surrounding said shaft rearwardly of said sealing member, said sealing ring having a forwardly and outwardly inclined conical sealing surface bearing against and substantially coextensive with the conical sealing surface provided on said sleeve portion, the radial thickness of said sealing ring being greater than the radial thickness of the sleeve portion of said sealing member whereby the conical face provided on the sealing ring is coextensive with and overlaps the conical face provided on the sealing member, a compression spring interposed between the shoulder on said casing and the radial flange on said sealing member and serving to normally urge said flange against said end closure member, and a compression spring interposed between the end wall of said casing and the rear face of said sealing ring and serving to normally urge said sealing ring forwardly within said bore against said deformable sealing member.

3. A seal as claimed in claim 1 including means for adjusting the position of the end closure axially of the shaft to vary the pressure exerted by said compression springs against the sealing member and sealing ring respectively.

4. A seal as claimed in claim 1 including means for varying the position of said end closure axially of the shaft to in turn vary the pressure existing between said conical surfaces, the radial thickness of said sealing ring being greater than the radial thickness of the sleeve portion of said sealing member whereby the conical face provided on the sealing ring overlaps the conical face provided on the sealing member, said sealing ring fitting closely within said bore and projecting forwardly thereof beyond said shoulder into said counterbore.

5. A shaft seal for sealing a space between relatively movable members including a shaft having a substantially cylindrical surface and a surrounding housing providing an end wall, a cylindrical bore extending forwardly from said end wall, an open ended counterbore defining a forwardly facing shoulder, and an end closure for said counterbore, said seal comprising an annular sealing member of a deformable material having a low coefficient of friction with respect to the material of the shaft, said sealing member having a radial flange at its forward end provided with a cylindrical peripheral surface adapted to fit closely within said counterbore and having a front face adapted to bear against said end closure, a sleeve portion extending rearwardly from said radial flange and through which said shaft is adapted to extend, the rear end of said sleeve portion being inclined rearwardly and inwardly to provide a conical sealing surface, a rigid sealing ring rearwardly of said sealing member adapted to fit within said bore and to closely surround said shaft, said sealing ring having a forwardly and outwardly inclined conical sealing surface bearing against the conical surface provided on said sleeve, a compression spring telescopically received over the sleeve portion of said sealing member and bearing at one end against said flange and at its other end against said shoulder, and a compression spring bearing at one end against said end wall and at its other end against the rear face of said sealing ring for urging the latter against said sealing member.

References Cited in the file of this patent

UNITED STATES PATENTS

| | | |
|---|---|---|
| 2,522,231 | Loftis | Sept. 12, 1950 |
| 2,567,527 | Parks | Sept. 11, 1951 |

FOREIGN PATENTS

| | | |
|---|---|---|
| 251,406 | Germany | Oct. 3, 1912 |